F. R. TURNER.
CROSS CHAIN FOR TIRES.
APPLICATION FILED APR. 4, 1917.

1,265,403.

Patented May 7, 1918.

WITNESSES

INVENTOR
Frank R. Turner
BY
ATTORNEYS

UNITED STATES PATENT OFFICE.

FRANK R. TURNER, OF DORCHESTER, MASSACHUSETTS.

CROSS-CHAIN FOR TIRES.

1,265,403.

Specification of Letters Patent.

Patented May 7, 1918.

Application filed April 4, 1917. Serial No. 159,624.

*To all whom it may concern:*

Be it known that I, FRANK R. TURNER, a citizen of the United States, and a resident of Dorchester, Boston, in the county of Suffolk and State of Massachusetts, have invented a new and Improved Cross-Chain for Tires, of which the following is a full, clear, and exact description.

My invention relates to anti-skid chains for tires and more particularly relates to the cross chains thereof. The invention has for its purpose to provide elements associated with the links of the cross chain and so formed and disposed relatively thereto as to present an increased surface, thereby distributing the wear and thus prolonging the life of the links, and at the same time very materially contributing to the strength of the cross chain. To attain the object of the invention, use is made of blocks within those links of the cross chain subjected to the greatest wear and strains, the number of links of the particular cross chain so equipped depending on the nature of the tire to which the chain is to be applied, the ordinary pneumatic tire requiring a less number of my improved links than the solid tires used on heavy vehicles.

The invention will be particularly explained in the specific description following.

Reference is to be had to the accompanying drawings forming a part of this specification in which similar reference characters indicate corresponding parts in all the views.

Figure 1:
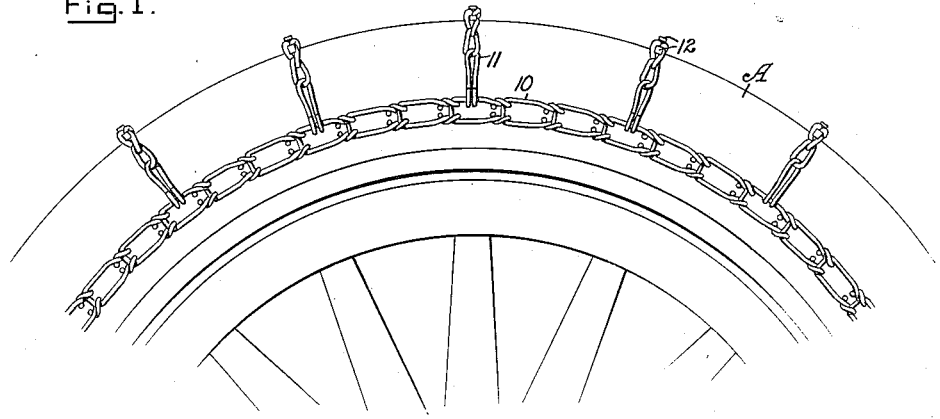
Fig. 1 is a side elevation of a section of a tire chain embodying my invention, showing the same applied.
Figure 2:
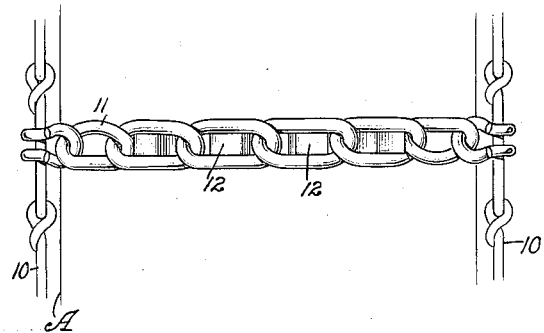
Fig. 2 is a fragmentary plan view on an enlarged scale, showing one of my improved cross chains indicating diagrammatically a portion of a tire casing.
Figure 3:
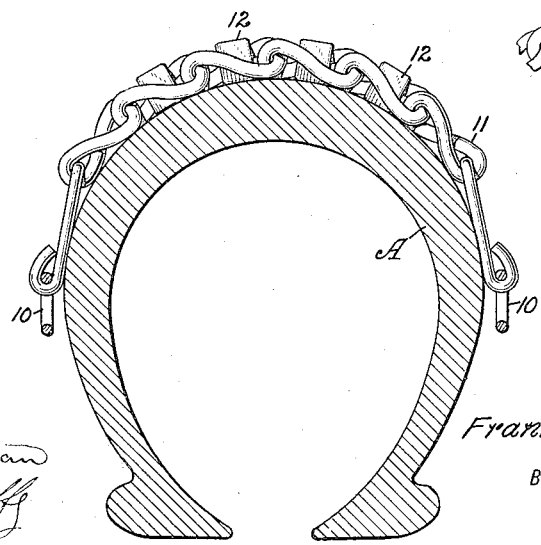
Fig. 3 is a transverse section on the scale shown in Fig. 2.
Figure 4:
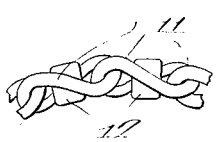
Fig. 4 is a fragmentary side view showing blocks with their inner and outer surfaces flush with the link surfaces.

My invention is shown applied to a pneumatic tire, the letter A indicating the casing thereof. The chain may be in general of any approved form, there being indicated side chains of known form and cross chains 11.

In accordance with my invention I provide all or certain of the links of each cross chain with hardened steel blocks 12, inserted in the respective links and welded or otherwise rigidly fastened thereto in order that the outer and lower surfaces of the blocks may have a fixed relation to the outer and inner wear surfaces of the links.

In practice when the chain is to be applied to a pneumatic tire, the blocks 12 at the inner side of the chain are approximately flush with or slightly radially outward from the inner bearing surface of the chain while the outer surfaces of the blocks are slightly outward from the chain links to better take the wear, the result being that the pressure will cause the blocks and links to both bear on the tire about equally. In the case of a solid tire, I prefer to produce the blocks so that both the inner and outer surfaces will be flush with the link surfaces, an advantage of this only being that when the outer side wears the cross chain may be reversed, thereby bringing the inner side outermost to take the wear of the road.

It is to be noted that the links have each side thereof disposed diagonally to the adjacent side of the block, the result of which construction is to dispose the sides of the links extending obliquely from one inner corner to the opposite outer corner and of opposite obliquity at the opposite sides of the block. The arrangement results in a strong bond between the link and chain when the same are welded into a homogeneous, unitary link element. The blocks also are in all cases flush with the wearing surfaces of the link ends or in planes sufficiently proximate to the planes of the link ends to result in a face of the block and the corresponding ends of the link jointly taking the wear. Moreover, the oblique disposition of the sides of the link positions the wearing surfaces of the block so that even if the link ends be worn down materially and almost through, the block will still constitute a holding tie between the sides of the link holding it rigid notwithstanding the material extent of the wear on the link ends.

In order to prevent cutting of the tire, the edges at the outer and inner faces of the blocks are slightly rounded.

It will be clear from the foregoing that the block formed and disposed as described will directly strengthen the link by preventing breaking or crushing of the links in addition to materially increasing the total wearing surface thereof.

Having thus described my invention I claim as new and desire to secure by Letters Patent:

1. In a tire chain, a cross chain including links and blocks in the links between the sides of the latter, the sides of the blocks being united to the said sides of the links to form a homogeneous link unit, the said blocks presenting inner and outer surfaces to jointly form with the links the inner and outer bearing surfaces of the cross chain.

2. As an article of manufacture, a chain link and a hardened metal block in said link between the sides thereof and rigidly united at its opposite sides to the sides of the link to form therewith a homogeneous link unit, said block presenting an inner surface forming with the inner surfaces of the ends of the link the inner contact surface of the link unit.

3. As an article of manufacture, a chain link and a hardened metal block interposed between the sides of the link, each of said sides of the link being oblique to the adjacent side of the block and the respective sides of the link being of opposite obliquity, said block being united at both its side surfaces with the sides of the link forming a unitary homogeneous link unit, and said block presenting inner and outer surfaces in planes sufficiently proximate to the inner and outer surfaces of the link ends to take the wear jointly with said link ends.

FRANK R. TURNER.